(12) United States Patent
Stiens et al.

(10) Patent No.: US 8,126,023 B2
(45) Date of Patent: Feb. 28, 2012

(54) LASER OUTPUT SWITCHING BY TRANSVERSE MODE MODULATION

(75) Inventors: Johan Stiens, Brussels (BE); Werner Vandermeiren, Houtem/Vilvoorde (BE)

(73) Assignee: Vrije Universiteit Brussel, Brussels (BE)

( * ) Notice: Subject to any disclaimer, the term of this patent is extended or adjusted under 35 U.S.C. 154(b) by 27 days.

(21) Appl. No.: 12/298,873

(22) PCT Filed: Apr. 30, 2007

(86) PCT No.: PCT/EP2007/003812
§ 371 (c)(1), (2), (4) Date: Oct. 28, 2008

(87) PCT Pub. No.: WO2007/128453
PCT Pub. Date: Nov. 15, 2007

(65) Prior Publication Data
US 2009/0074015 A1    Mar. 19, 2009

(30) Foreign Application Priority Data
Apr. 28, 2006 (EP) .................................... 06008856

(51) Int. Cl.
*H01S 3/098* (2006.01)
(52) U.S. Cl. .................. 372/19; 372/9; 372/10; 372/11; 372/12; 372/13; 372/14; 372/18
(58) Field of Classification Search .................... 372/18, 372/19, 25, 26, 9, 10, 11, 12, 13, 14
See application file for complete search history.

(56) References Cited

U.S. PATENT DOCUMENTS

| 3,680,001 A | | 7/1972 | Paoli et al. |
| 3,699,474 A | * | 10/1972 | Landry ........................... 372/17 |
| 4,493,085 A | * | 1/1985 | Valley ............................. 372/19 |
| 4,910,739 A | * | 3/1990 | Sheng ............................. 372/19 |
| 4,942,588 A | * | 7/1990 | Yasui et al. ................... 372/103 |
| 5,151,917 A | * | 9/1992 | Perilloux et al. .............. 372/102 |
| 6,292,505 B1 | * | 9/2001 | Takenaka et al. ............... 372/97 |

OTHER PUBLICATIONS

Matizen Yu E et al.: "Control of Transverse Laser Modes and Attainment of the Required Mode Combination", Soviet Journal of Quantum Electronics, American Institute of Physics, New York, NY, US, vol. 19, No. 12, Dec. 1, 1989, pp. 1591-1594, XP000141864.

(Continued)

*Primary Examiner* — Yuanda Zhang
(74) *Attorney, Agent, or Firm* — Bacon & Thomas, PLLC

(57) ABSTRACT

A pulsed laser for machining, has a mode switch, e.g. Q-switch device (15, 30, 40), in a resonant optical cavity (20) capable of supporting a given lasing mode, e.g. a transverse mode of oscillation when lasing action is started, arranged to induce, e.g. temporarily, a localized change, e.g. loss, in the cavity. The latter alters the given lasing mode, e.g. causes the oscillation to hop to a higher transverse mode temporarily, which on its hand may be extinguished by an aperture limiting diaphragm (5) or equivalent and subsequently reduce the induced loss temporarily, to return the oscillation to the given transverse mode and output the laser pulse. A modulator can be used for inducing the temporary loss for a first transverse lasing mode and extinguishing the higher transverse mode with a diaphragm. The induced loss can be over a localized area much smaller than the dimensions of a beam of the laser, so that a miniaturized modulator can be used. In this way pulsed operation may be achieved. Alternatively, a steady switch between modes may be achieved.

23 Claims, 9 Drawing Sheets

OTHER PUBLICATIONS

Amiel A Ishaaya et al.: "Efficient Selection of High-Order Laguerre-Gaussian Modes in a Q-Switched Nd: YAG Laser", IEEE Journal of Quantum Electronics, IEEE Service Center, Piscataway, NY, US, vol. 39, No. 1, Jan. 2003, XP011065334.

Friesem A A et al.: "Laser mode selection with intracavity phase elements", Lasers and Electro-Optics Europe, 2003. CLEO/Europe. 2003 Conference on Munich, Germany Jun. 22-27, 2003, Piscataway, NY, USA, IEEE, Jun. 22, 2003, pp. 106-106, XP010710562.

Yao G et al.: "Dynamics of transverse mode in self-Q-switched solid-stage lasers", Optics Communications, North-Holland Publishing Co. Amsterdam, NL, vol. 114, No. 1, Jan. 15, 1995, pp. 101-105, XP004014213.

Clarkson W. A. et al.: "High-Power Diode-Bar End-Pumped ND: YLF Laser at 1.053 MUM", Optics Letters, OSA, Optical Society of America, Washington, DC, US, vol. 23, No. 17, Sep. 1, 1998, pp. 1363-1365, XP000783338.

Valle A: "Selection and Modulation of High-Order Transverse Modes in Vertical-Cavity Surface-Emitting Lasers", IEEE Journal of Quantum Electronics, IEEE Service Center, Piscataway, NJ, US, vol. 34, No. 10, Oct. 1998, XP011052065.

* cited by examiner

TEM$_{00}$   TEM$_{01}$   TEM$_{10}$   TEM$_{11}$

LASER OUTPUT SWITCHING BY TRANSVERSE MODE MODULATION

TECHNICAL FIELD OF THE INVENTION

The present invention relates to active medium based devices such as lasers, e.g. to methods and devices for generating laser light. More particularly, the present invention relates to methods and systems for producing laser pulses, e.g. Q-switched laser pulses.

BACKGROUND OF THE INVENTION

Amplitude modulation of optical signals plays an important role in various industrial sectors: e.g. communication, material processing. An extreme form of amplitude modulation is on/off modulation, which is the modulation format used in pulsed laser material processing and high-speed free space laser communication. Whereas in communication systems, the achievable modulation bandwidth is the crucial parameter, in laser based material processing it is rather the optical power handling capability.

The range and importance of laser based material processing in modern manufacturing is expanding at an impressive rate across many sectors in industry. Laser based material processing is inherently contact free. As such the problem of rapid wearing mechanical processing tools can be drastically reduced. The trend in pulsed laser material processing is to use short pulses with high peak power in order to improve the edge quality. The high laser beam intensity provided by short pulse laser technology results in the vaporization-dominated material removal rather than the melt-expulsion-dominated mechanisms using longer duration pulses. This produces less thermal and mechanical shocks, less peripheral heat flow, what leads to reduced heat affected zones (HAZ) and less burn formation and hence more precise material removal. Just as important the short pulse duration produces very high peak power. This high peak power allows the laser to process difficult materials. Due to the Q-switching mode, the peak power can be much higher than CW power lasers, meaning that much smaller lasers can be built to produce very high optical powers. Smaller lasers mean lower cost of ownership. Another advantage of such compact lasers is the possibility to mount them directly on robotic arms.

When short powerful laser pulses can be provided at a high repetition rate, precision laser based material processing can be drastically speeded up. A whole series of micro-machining applications can benefit from this: drilling or perforating of numerous small holes in industrial materials without charring the edges of the material, trimming applications. Heavy industrial applications such as for example welding, scribing, slotting, surface modifications of materials, surface removal, stripping, and medical applications such as for example surgery, dental, and dermatology applications also benefit from it.

The existing solutions for producing short pulses are the on/off switching of the direct driving power of the lasers or introducing an extra amplitude/phase/polarisation modulating device inside the laser cavity during the state of population inversion. The peak power and the efficiency of directly pulsed lasers are limited and their pulse repetition rates have an upper limit. Q-switching—the process whereby the pumping action of the laser is continuous so that a large population inversion is waiting for a moment when the beam is allowed for only a brief time to pass back and forth between the mirrors to achieve the laser action—can only be accomplished by introducing an additional modulation device. In Q-switching lasers the peak intensities can be tens to hundreds of times higher than in the direct drive schemes.

Another possibility to modulate the output of the laser is by switching the between the transverse modes of a laser.

A variety of optical modulation principles such as electro-optic, acousto-optic, magneto-optic and modulation schemes such as Fabry-Pérots modulators, Mach-Zehnder interferometers can be exploited inside the laser cavity to obtain Q-switching or high repetition rate pulse generation. In all existing solutions, whatever the physical interaction principle used, the area of the modulating device is at least as big as the area of the laser beam propagating inside the cavity. It is clear that in all these cases the cost of the modulating device is a function of the area of the laser beam.

SUMMARY OF THE INVENTION

It is an object of the invention to provide improved apparatus or methods for providing laser light. The above objective is accomplished by a method and device according to the present invention.

The present invention relates to a laser for outputting laser radiation, the laser comprising a lasing material in a resonant cavity adapted for supporting a given lasing mode of oscillation, wherein the laser furthermore comprises a mode switch adapted to induce a change in only a part, e.g. a localized area, of a beam of the laser substantially smaller than the dimension of the beam of the laser, for altering the given lasing mode.

It is an advantage of embodiments of the present invention, that no part with at least dimensions of the order of the laser beam need to be displaced. It also is an advantage of embodiments of the present invention that types of selection, change or modulation that can be performed are easily selectable. It is an advantage of some embodiments according to the present invention that the modulation does not need to be based on interferometry. It is an advantage of embodiments according to the present invention that the local modulation may be a modulation of e.g. an absorption coefficient, a phase change or a polarization state.

The localized area may be substantially smaller than the dimension of a cross-section of a beam of the laser. The cross-section may be a cross-section perpendicular to the light path of the beam of the laser. Substantially smaller may be smaller than 90%, e.g. smaller than 50%, e.g. smaller than 25%, e.g. smaller than 10%, e.g. smaller than 5%, e.g. smaller than 1%, e.g. smaller than 0.1% of the cross section in the direction perpendicular to the light path. It is an advantage that only a small portion of the laser beam is blocked in order to avoid heating problems and in order not to reduce the power too much. The given lasing mode of oscillation may be the lasing mode of oscillation typically supported when lasing action is started. It is an advantage of embodiments of the present invention that efficient systems for pulsing or for switching modes are obtained, that are cost effective. It is also an advantage of embodiments of the present invention that efficient systems are obtained which allow a good thermal control.

The induced change may cause the lasing mode of oscillation to hop to a different lasing mode of oscillation. The different lasing mode of oscillation may be an allowed lasing mode or may be a non-allowed lasing mode, suppressed in the laser. It is an advantage of particular embodiments of the present invention that a method for switching between two allowed lasing modes may be obtained.

The mode switch may comprise a loss modulator for inducing a loss in a localised area of a beam of the laser. The loss may be a power loss in a localised area of a beam of the laser.

The localised area may be a single region or may comprise a plurality of distinct regions, e.g. not interconnected, the total thereof being smaller than the dimension of the beam of the laser.

The induced change may be a temporarily induced change. It is an advantage of embodiments of the present invention that efficient systems for pulsing are obtained, e.g. efficient high power pulsing systems. It furthermore is an advantage that an improved heat control of the laser system is obtained.

The mode switch may comprise an extinguisher for extinguishing the different lasing mode. It is an advantage of embodiments of the present invention that switching is performed by altering a lasing mode to a lasing mode that cannot be supported in the laser, also referred to as a forbidden or not-allowed lasing mode.

The extinguisher may comprise a diaphragm having one or more apertures arranged to extinguish the different lasing mode(s), e.g. the higher transverse mode. Alternatively or in addition thereto, the extinguisher may be adapted for extinguishing the different lasing mode or modes by any or a combination of inducing losses due to absorption, polarisation changes, phase changes, scattering effects and diffraction effects.

The mode switch furthermore may be adapted to relax the induced change such that the oscillation returns to the first lasing mode and outputs a laser pulse according to the first lasing mode.

The lasing mode may be a transverse mode of oscillation, a different lasing mode(s) may be a higher lasing mode(s). The different lasing mode(s) may be a not allowed lasing mode in the resonant optical cavity. It is an advantage of embodiments of the present invention that fast pulsing may be obtained, e.g. also in high power pulsed laser systems.

The part of the beam of the laser may be a localized area which may be positioned where there are peaks in the energy of the given lasing mode. The energy may be concentrated at the centre of the beam, so the mode switching means can be located at the centre, making it easier to design and manufacture. For other modes, power may be concentrated at multiple locations or distributed away from the centre.

The given lasing mode may be the lowest transverse mode.

At least part of the mode switch may be incorporated into a mirror of the cavity. The at least part of the mode switch may be the loss modulator or the extinguisher.

The part of the beam of the laser may be a part of the cross-section of the beam of the laser and the dimension of the beam of the laser may be a dimension of the cross-section of the beam of the laser.

The mode switch may comprise a moveable component substantially smaller than the dimension of the beam of the laser, the moveable component being moveable with respect to the beam of the laser, wherein the moveable component influences only said part of the beam of the laser and not the whole beam of the laser.

The laser furthermore may comprise a controller for controlling the mode switching means adapted to bring the laser in a first state having a first lasing mode not sustained in the resonant optical cavity and for inducing a temporary change for temporary altering the given first lasing mode to a second lasing mode sustained in the resonant optical cavity, thus outputting the laser pulse.

The present invention also relates to a machining device comprising a laser for outputting laser radiation, the laser comprising a lasing material in a resonant cavity adapted for supporting a given lasing mode of oscillation, wherein the laser furthermore comprises a mode switch adapted to induce a change in only a part, e.g. a localized area, of a beam of the laser substantially smaller than the dimension of the beam of the laser, for altering the given lasing mode. The part may be a single region or may comprise a plurality of distinct regions, e.g. not interconnected, the total thereof being smaller than the dimension of the beam of the laser. Other features of the laser in the machining device may be as set out above.

The present invention furthermore relates to a method of controlling a laser, e.g. to produce a laser pulse, the laser comprising a lasing material in a resonant optical cavity capable of supporting a given transverse mode of oscillation when lasing action is started, the method comprising supporting a beam of the laser having a given lasing mode of oscillation and inducing a change in a localised area of said beam for altering the given lasing mode. The present invention also relates to a method of controlling a laser, the laser comprising a lasing material in a resonant optical cavity capable of supporting a given transverse mode of oscillation when lasing action is started, the method comprising bringing the laser in a state having a given first lasing mode of oscillation, inducing a change in only a part of a beam substantially smaller than the dimension of the beam of the laser, for altering the given first lasing mode.

The methods may be adapted to produce a laser pulse, wherein said first lasing mode is not sustained in the resonant optical cavity and wherein said inducing a change is inducing temporary a change for temporary altering the given first lasing mode to a second lasing mode sustained in the resonant optical cavity, thus outputting the laser pulse. Bringing the laser in a state having a first lasing mode being not sustained may comprise extinguishing said mode. Inducing a change may comprise altering a loss causing the first lasing mode to hop to the second lasing mode. The second lasing mode may be a lowest transverse mode.

The methods may be adapted to produce a laser pulse, wherein bringing the laser in a state comprises supporting a beam of the laser having a given first lasing mode of oscillation, and wherein inducing a change comprises inducing a temporary change by inducing a loss, said method further comprising after said temporary inducing a change, subsequently reducing the induced loss temporary thus temporary returning the lasing mode to the first lasing mode and outputting the laser pulse. The first lasing mode may be a lowest transverse mode.

The inducing a change may be inducing temporary a change.

The first lasing mode may be a first transverse lasing mode sustained in the resonant optical cavity and altering the given first lasing mode may be altering to a second lasing mode, being a second transverse lasing mode sustained in the resonant optical cavity.

The method may comprise using a modulator for inducing a temporary loss causing the given lasing mode to hop to a different lasing mode and extinguishing the different lasing mode.

The method may comprise narrowing one or more apertures of a diaphragm to extinguish the different lasing mode. The narrowing may be reducing the aperture size.

The localized area may be positioned where there are peaks in the energy of the given transverse mode.

The given lasing mode may be a lowest transverse mode.

The present invention also relates to a controller for controlling a laser to produce laser radiation according to a method of controlling a laser to produce a laser pulse, the laser comprising a lasing material in a resonant optical cavity capable of supporting a given transverse mode of oscillation when lasing action is started, the method comprising supporting a beam of the laser having a given lasing mode of oscillation and inducing a change in a localised area of said beam for altering the given lasing mode.

It is an advantage of embodiments of the present invention that the use of a higher transverse mode before the pulse allows the mode switch to be implemented more easily or cost effectively than previously known, since less loss is needed to cause a temporary hop to a higher transverse mode than to temporarily prevent all transverse lasing modes. Hence the mode switch can be smaller and faster, and require less cooling. This is particularly significant for lasers of sufficient power for machining or micro-machining applications as discussed above.

It is also an advantage of some embodiments of the present invention that the Q switch has a modulator for inducing the temporary loss and an extinguisher for extinguishing the higher transverse mode when the localized loss has been introduced. This is a useful separation of functions which can enable the pulse to be produced more effectively, to implement a split and extinguish principle. Separating lower order loss and higher order extinguishers may allow to optimise both functions and to have a more adaptable system for various laser systems. An alternative may be to have no extinguisher and use the loss induced by the modulator to control the transitions to and from the higher transverse mode.

It is an advantage of some embodiments of the present invention that efficient hopping between transverse mode patterns of the laser cavity can be achieved.

Particular and preferred aspects of the invention are set out in the accompanying independent and dependent claims. Features from the dependent claims may be combined with features of the independent claims and with features of other dependent claims as appropriate and not merely as explicitly set out in the claims.

Although there has been constant improvement, change and evolution of devices in this field, the present concepts are believed to represent substantial new and novel improvements, including departures from prior practices, resulting in the provision of more efficient, stable and reliable devices of this nature.

The teachings of the present invention permit the design of improved methods and apparatus for generating laser pulses.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

Any of the additional features can be combined together and combined with any of the aspects. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings. The features of the presented invention will be more clearly understood from consideration of the following description in combination with the accompanying drawings, in which.

Figure 1:
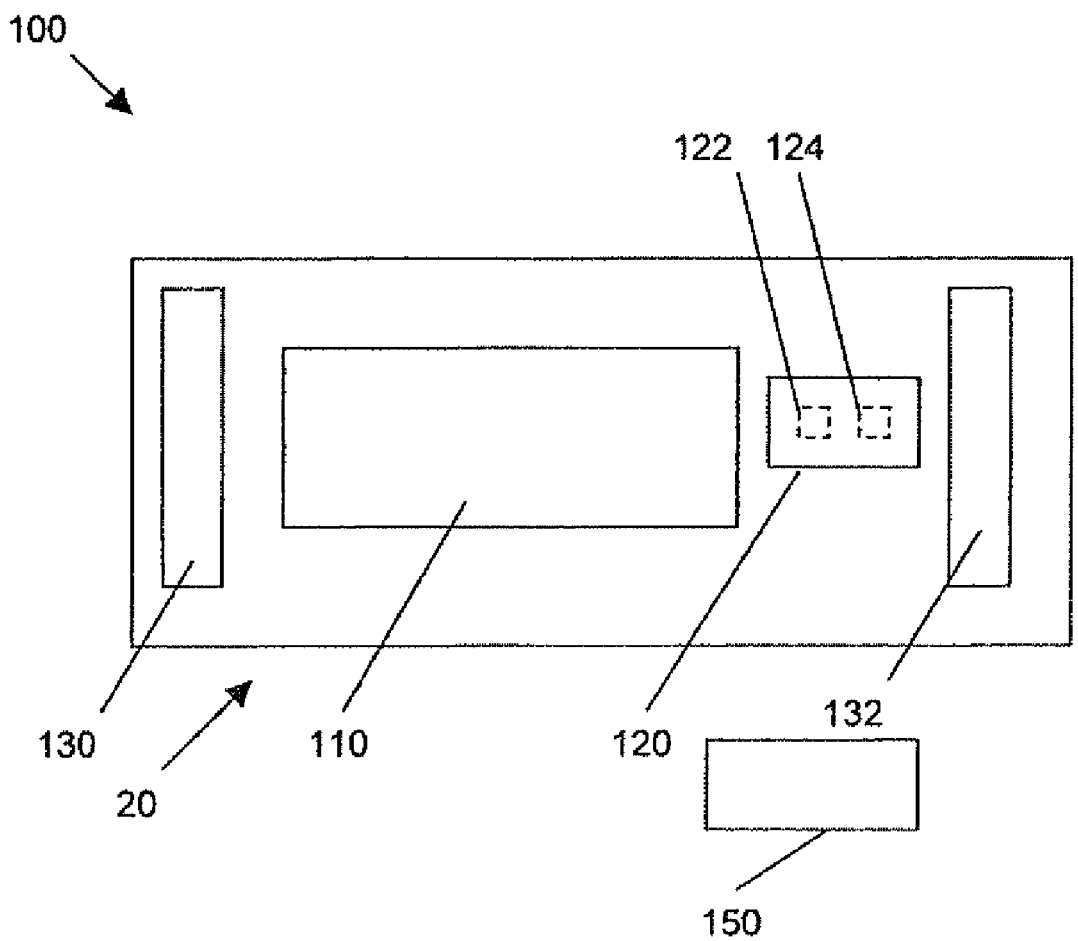
FIG. 1 shows a schematic representation of an active-medium based device, according to embodiments of the present invention.

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Devices and systems according to various embodiments as well as the making and use of the various embodiments are discussed below in detail. However, it should be appreciated that the present invention provides many applicable inventive concepts, which can be embodied in a wide variety of specific contexts. The specific embodiments discussed are merely illustrative of specific ways to make and use the invention, and do not limit the scope of the claims of the invention.

Device embodiments of the present invention typically are related to an active medium based device, such as a laser system, as shown in FIG. 1. Such a laser system may be O-switched, mode-locked or in general pulsed. Such a laser system 100 comprises a laser material or active material 110 in a resonant optical cavity 20. This cavity 20 typically is tuned and aligned such that a given lasing mode, having a transverse mode pattern, would propagate when laser action is triggered. The laser system, according to embodiments of this invention comprises a mode switch 120, such as e.g. an active modulator or a passive saturable absorber. The mode switch 120 is adapted to induce a change in a localised area of a beam of the laser, whereby the localised area is substantially smaller than the dimensions of the beam of the laser. The change may be induced directly. Substantially smaller than the dimensions of the beam of the laser, may be smaller than 90%, e.g. smaller than 50%, e.g. smaller than 10%, e.g. smaller than 5%, e.g. smaller than 1% or e.g. smaller than 0.1%. Typically the localised area wherein a change is induced, e.g. directly induced, is as small as possible to avoid heating problems and not to block too much power, but is sufficiently large to influence the given lasing mode substantially. The specific shape of the area of the beam, e.g. of the cross-section of the beam, that is influenced may be various and may be adapted to influence these regions of the beam comprising substantially regions where the lasing mode substantially contributes, e.g. regions with the largest intensity, although the invention is not limited thereto. A localised area of a beam of the laser may be an area in the cross-section of the laser beam, i.e. an area in the cross-section taken perpendicular to the light path. In other words, a modulator is used that only influences part of the beam or beam cross-section directly. The latter is performed to alter the given lasing mode, i.e. the lasing mode that typically propagates, e.g. when laser action is triggered. It may result in the lasing mode, e.g. the transverse mode pattern, to hop to a different mode pattern, e.g. a different transverse mode pattern. Typically inducing a change may comprise inducing a loss, e.g. power loss in the beam. As will be further discussed below, the mode switch 120 may comprise a loss modulator 122 and/or an extinguishers 124. The laser system furthermore typically may comprise laser mirrors 130, 132. The driving power of the active laser medium brings the laser in a state of population inversion, allowing the laser system 100 to operate in a first lasing mode. By using a mode switch 120 adapted to induce first lasing conditions, the laser thus may hop to a different lasing mode, e.g. a higher transverse lasing mode. The mode switch 120 furthermore typically may be adapted to change the lasing conditions back such that the laser system hops to the first lasing mode again. Using this mode switching allows to generate a short but intense laser pulses, as typically loss is again increased then and the laser system switches again to a different, e.g. higher transverse mode. The mode switch 120 may e.g. be an active or passive modulating device that is aligned and forced into such a state that sufficient localized optical losses are induced such that the laser hops to a different mode than the first lasing mode, e.g. a higher transverse mode. This different mode, e.g. higher transverse mode, is however, brought into cut-off by the extinguishers 124, e.g. by setting a suitable opening of a diaphragm, or e.g. by using an aperture limited or Gaussian mirror. This brings the modulating device temporarily into a state of low optical losses for a lower transverse mode pattern, which means the laser will output a short but intense laser pulse. The dimensions of the loss modulator 122, also referred to as transverse mode loss switch, e.g. Q-switching device, of this invention can be much smaller than the dimensions of the laser beam and can be positioned accordingly such that the most efficient hopping between transverse mode patterns of the laser cavity can be realized. The mode switch 120, e.g. O-switching device, can be based on any modulating principle such as those already well known in laser technology: AO (acoustic-optical), EO (electrical-optical), MO (mechanical-optical) principles, Fabry-Perot, Mach-Zender, mechanical principles such as polygon scanners, resonant scanners, optical shutters or based on passive saturable absorbers.

When the mode switch 120, which acts as an active modulating device, is used inside a laser cavity and the correct steering pulses are fed into the mode switch 120, it can yield a high repetition-rate short and powerful laser pulses, e.g. Q-switched laser pulses. The operating principle of the laser thus may be based on forcing mode hopping, e.g. transverse cavity mode hopping, by introducing a small obstacle to induce losses inside the laser cavity.

In other words, in some embodiments of the present invention a method of controlling a laser is described whereby the laser comprising a lasing material in a resonant optical cavity capable of supporting a given transverse mode of oscillation, when lasing action is started. The method thereby comprises bringing the laser in a state having a given first lasing mode of oscillation, inducing a change in only a part of a beam substantially smaller than the dimension of the beam of the laser, for altering the given first lasing mode. The laser may first be in a condition wherein no transverse lasing modes are sustained by the cavity, whereby, in embodiments for creating a laser pulse, a pulse is generated by inducing a change such that a switch is made from a situation whereby no transverse lasing modes are sustained to a situation wherein a transverse lasing mode is sustained and back, thus outputting a pulse. In other words, the original lasing mode is not sustained in the resonant optical cavity or extinguished, e.g. by introducing a loss and inducing a change is temporary inducing a change is inducing temporary a change for temporary altering the given first lasing mode to a second lasing mode sustained in the resonant optical cavity, thus outputting the laser pulse. The laser may also initiate with a sustained laser mode, whereby the laser is first brought, e.g. using a mode switch, to a mode not sustained by the resonant cavity, whereafter a pulse is generated as described above.

In accordance with some embodiments of the invention, the invention also relates to switching between different lasing modes, e.g. different transverse lasing modes, of a laser. In this case the extinguisher causing temporary switching, is not needed in the cavity and by switching the lasing conditions, e.g. the local optical losses induced by the mode switch 122, the output of the laser switches to another transverse mode.

Some embodiments of present invention will now be described with reference to the drawings. By way of introduction, some characteristics and the benefits of the pulse producing method, exploiting modulation devices with strongly reduced dimensions are discussed. Later, how the method can be applied to some well known modulation schemes will be discussed.

Some of the systems and methods proposed here enable much more cost-effective pulsed laser solutions with "near" single mode laser operation. There is a need in the market of industrial material processing for compact light modulators featuring low power dissipation together with a long lifetime for pulsed laser systems, e.g. Q-switching lasers, which improve performance and economics of existing applications. It is desirable to make the pulsed laser systems, e.g. Q-switched lasers lower in cost, more reliable than the present state of the art technologies without sacrificing Q-switching performance, and with higher peak power and shorter pulses. The embodiments described below use a mode switch 120, e.g. based on a split and extinguish modulator principle, to address the shortcomings of modulators in various spectral windows of industrial laser processing.

In a first embodiment of the invention, a system and corresponding method as described above, is shown, for achieving pulse generation from a laser which is in a state of population inversion. The mode switch 120 thereby typically may comprise a loss modulator 122. When there is no modulating device or mode switch inside a laser cavity, there is a competition between the different transverse modes of a laser cavity, as known from prior art. In rectangular systems, the electrical fields of these transverse cavity modes are typically the Hermite-Gaussian mode patterns described by formulas (1-4). These rectangular mode patterns are also called TEMnm patterns, referring to transverse electromagnetic patterns where the index n indicates the number of zeros in the electrical field and the index m the number of zeros in the magnetic field. The n=m=0 mode is a pure Gaussian beam mode.

$$U_{m,n}^{HG}(x, t, z) = C_{m,n}^{HG}\left(\frac{w(o)}{w(z)}\right) \cdot \exp\left(-ik\frac{x^2+y^2}{2 \cdot R(z)}\right)\exp\left(-\frac{x^2+y^2}{w^2(z)}\right) \cdot \quad (1)$$

$$\exp(-i\{m+n+1\}\psi)H_n\left(\frac{x\sqrt{2}}{w}\right)H_m\left(\frac{y\sqrt{2}}{w}\right)$$

$$\psi(z) = \tan^{-1}\left(\frac{z}{z_R}\right) \text{ and} \quad (2)$$

$$z_R = \frac{\pi w^2(o)}{\lambda} \quad (3)$$

$$C_{m,n}^{HG} = \left(\frac{2}{\pi n!m!}\right)^{1/2} 2^{-N/2} \quad (4)$$

x and y indicate the transverse coordinates of the laser beam, having a propagation constant k, z is the propagation direction, w(z) is the z-dependent beam waist, R(z) is the z-dependent curvature dependence, Ψ is the phase term, $z_R$ is the Rayleigh range, λ the wavelength, $H_n$ and $H_m$ are Hermite polynomials of order n and m respectively and N=n+m+1. In axis-symmetric systems, the expressions for the electric fields of the laser cavity modes reduce to the typical Laguerre-Hermite polynomials.

Figure 2A:
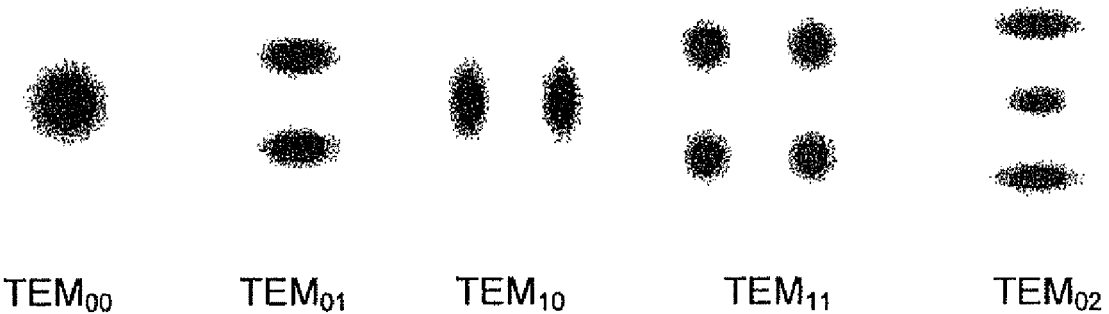
FIG. 2a shows the various transverse lasing modes of the rectangular Hermite-Gaussian type as can be used in embodiments according to the present invention.
Figure 2B:
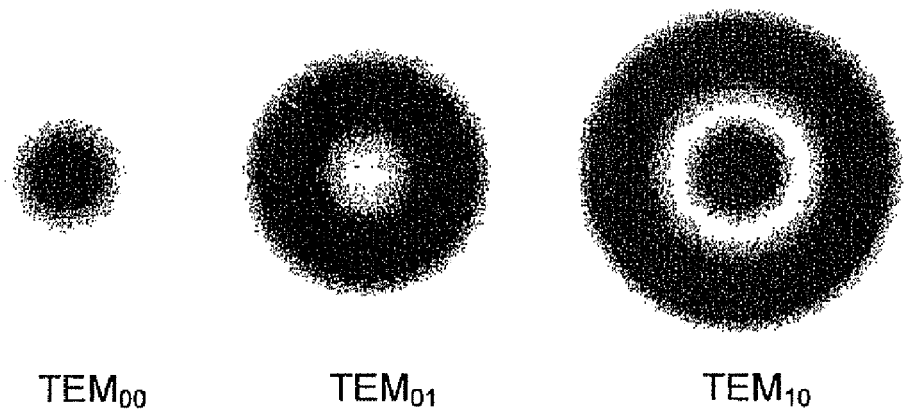
FIG. 2b shows the various transverse lasing modes of the axy-symmetric Laguerre-Gaussian type as can be used in embodiments according to the present invention.

The graphical representations of the intensity distributions of both, rectangular and axis-symmetric mode patterns of different orders are shown in FIGS. 2*a* and 2*b* respectively.

When the active material 110 inside a laser cavity 20 is brought into a level of population inversion, and there are no obstructions inside a cavity, the laser is ready to lase. The order of the mode, e.g. transverse mode, emitted by the laser depends on the alignment of the elements in the laser cavity 20. For a perfect aligned laser 100, it will typically lase in its lowest order mode. When the alignment is not perfect, the laser can lase also in other modes due to competition between the various lasing modes: the lasing mode with the largest difference between gain and loss will eventually win; when the gain/loss difference values of the different modes are very close it is also possible that the lasing mode pattern is not stable and that the laser hops from one mode to the other or various modes are simultaneously lasing.

For a simple linear resonator, comprising a back-side mirror and an output coupling mirror with reflectivity R with an active medium of length L and excited such that its low signal gain is $g_o$. L, the output power $P_{out}$ of the laser is given as follows:

$$P_{put} \div [g_o \cdot L - |\ln\sqrt{R \cdot V_t^2 \cdot V_{dif}}|] \quad (5)$$

It is assumed that the laser generates the lowest order Gaussian transverse mode pattern. In this equation the total loss factor of the gain medium is described by $V_t$=1-loss and the product of all diffraction loss factors is $V_{dif}$. Hence one can deduce the threshold to activate this laser $$(g_o \cdot L)_{th} = |\ln\sqrt{R \cdot V_t^2 \cdot V_{dif}}| \quad (6)$$

Figure 3A:
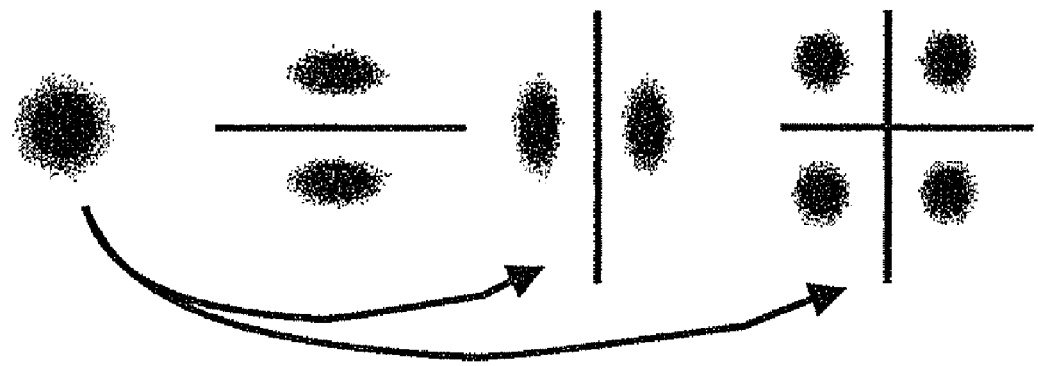
FIG. 3a is a schematic view of a mode switch structure aligned to induce transverse mode hopping as can be used in embodiments according to the present invention.

By putting an obstruction centred at the axis of the laser cavity, such as a very thin horizontal or vertical wire, or a crossed wire as indicated in FIG. 3, the laser will hop to a higher order lasing mode because the obstruction introduced by the (crossed) wire will be most sensed by the $TEM_{00}$ mode. The wire is a form of loss modulator 122 to induce losses, and is shown as a wire for ease of explanation of the effects, and the significance of the location. Other types of loss modulators 122 in which loss can be controlled more easily and rapidly are more practical for most applications, such as e.g. optically or electronically induced losses due to absorption, polarisation changes, phase changes, scattering effects, diffraction effects or due to beam displacement based on acousto-optic, magneto-optic, electro-optic or plasma-optic effects. Due to the high losses introduced to this low order mode, the laser will hop to a higher order mode because these higher order modes have much less optical energy confined along the axis of the laser cavity. As shown by way of example in FIG. 3*a*, if the localized obstruction is horizontal and across the centre of the beam, the higher transverse mode supported will be $TEM_{01}$ while if the localized obstruction is vertical and across the centre of the beam, the higher transverse mode supported will be $TEM_{10}$. If the localized obstruction is a cross at the centre of the beam, the higher mode supported will be $TEM_{11}$.

Figure 3B:
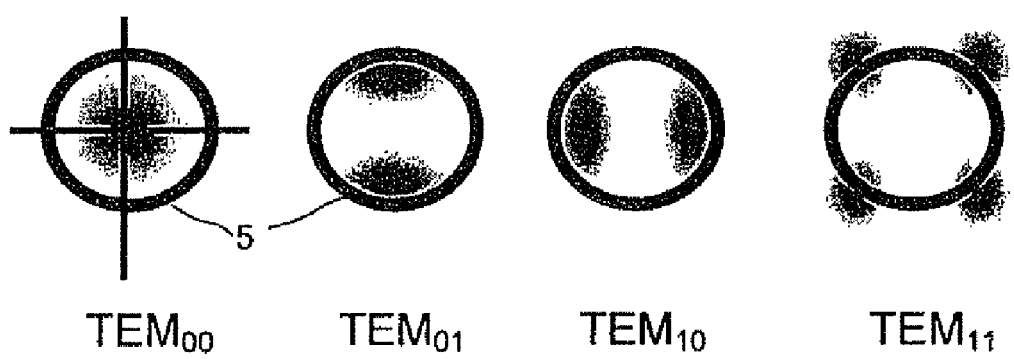
FIG. 3b shows an aligned mode switch structure in combination with a power limiting diaphragm as can be used in embodiments according to the present invention.
Figure 4:
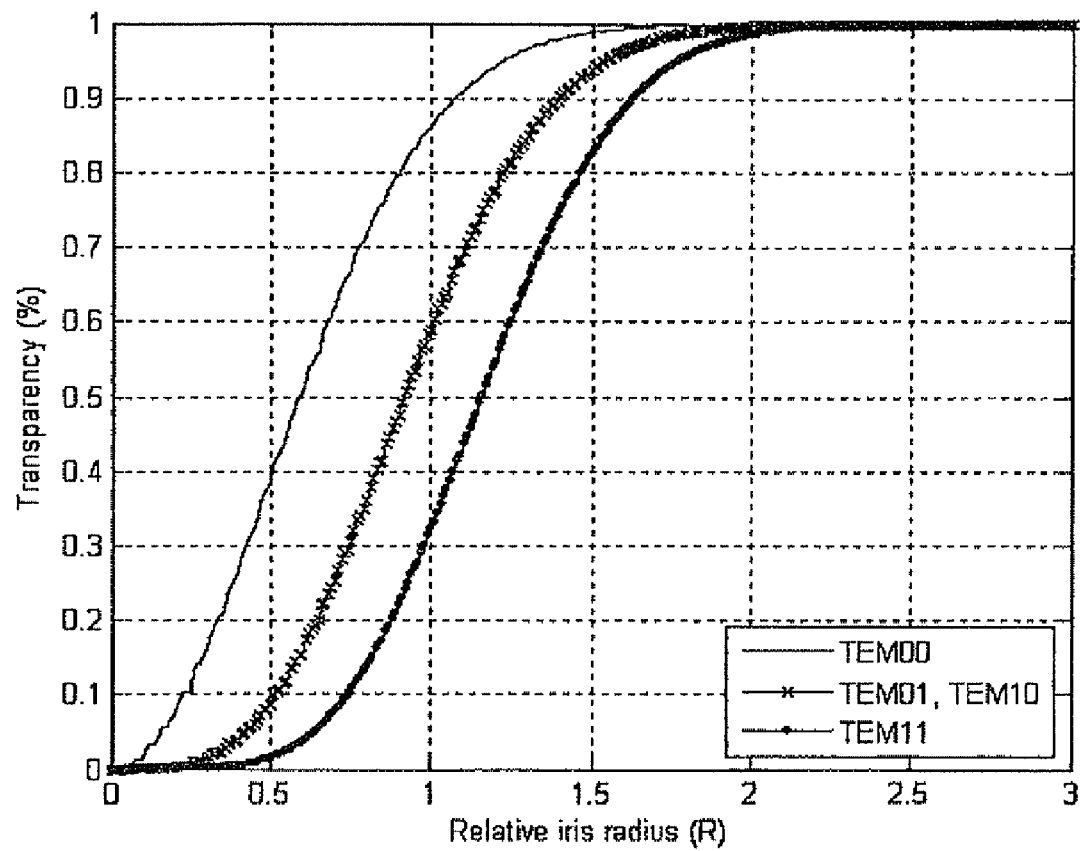
FIG. 4 show the relative power distribution versus relative diaphragm opening as may be obtained in embodiments according to the present invention.

However, the mode switch 120 furthermore may comprise an extinguisher 124, e.g. a diaphragm having an aperture 5 and located inside the laser cavity 20 such as shown in FIG. 3*b*. It then is possible to extinguish these higher order modes when the radius of the aperture of the diaphragm gets too small. FIG. 3*b* shows a view along the cavity to show the parts of the beam which would be excluded if the diaphragm has an aperture as shown, and blocks light outside the circle. In FIG. 4 it is shown how the transmitted power of the four lowest TEMnm transverse modes are attenuated by the aperture radius of the diaphragm. The aperture radius is expressed in relative values with respect to the beam waist of the pure Gaussian beam TEM00. The highest curve corresponds to the TEM00 mode, the middle curve is valid for TEM01 and TEM10, the lowest curve corresponds to the TEM 11 mode. These curves are only valid outside the laser cavity. These graphs show us that the highest order modes are much more affected than the lower order modes. E.g. for a diaphragm equal to the Gaussian beam radius the TEM00 mode is only for 12% attenuated whereas the TEM01/01 for 40% and the TEM11 even for 70%. These curves are only valid outside the laser cavity. Inside the laser cavity these loss values expressed in percentages need to be added to the losses of the cavity.

When introducing the diaphragm with relative aperture $r_{rel}$, an extra loss factor $V_{dia}=T_{dia}$ (here $T_{dia}$ is a transmission coefficient) is introduced through the diaphragm as indicated in FIG. 4. In combination with the losses introduced by the wired obstruction, expressed by loss factor $V_{obs}$, the lasing mode dependent output power, e.g. transverse mode dependent output power, can be expressed as follows:

$$P_{out}(n,m) \div [g_o \cdot L - |\ln \sqrt{R \cdot V_t^2 \cdot V_{dif} V_{dia}(n,m) \cdot V_{obs}(n,m)}|] \qquad (7)$$

By choosing the appropriate width of the (crossed) wire and the appropriate diameter of the diaphragm it is possible to switch on the zero order TEM00 mode when removing the (crossed) wire and extinguish all modes of the laser when introducing the wire. The diaphragm should be set to a maximum value such that when one removes the crossed wire, the laser operating in its lowest TEM00 order mode, will have a maximum power output. These conditions can be cast into the following equations:

$$P_{out}(0,0) \div [g_o \cdot L - |\ln \sqrt{R \cdot V_t^2 \cdot V_{dif} V_{dia}(0,0)}|] > 0 \qquad (8)$$

$$P_{out}(n,m) = 0 <=> [g_o \cdot L < |\ln \sqrt{R \cdot V_t^2 \cdot V_{dif} V_{dia}(n,m) \cdot V_{obs}(n,m)}|] \qquad (9)$$

for all higher modes (n or m≠0)

Figure 5A:
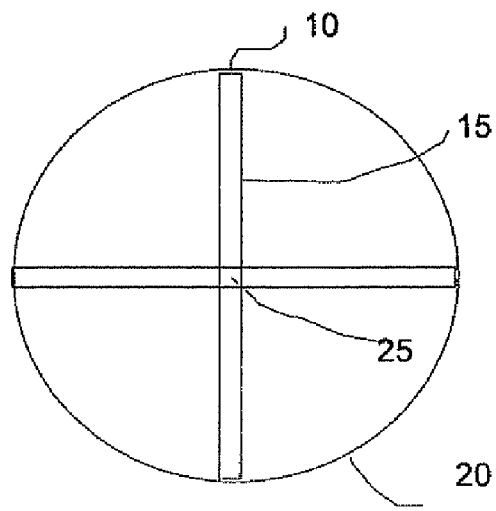
FIGS. 5a, 5b and 5c shows various variations on the geometry of the active modulator or passive saturable absorber structure (a) centred beam-sized crossed obstruction (b) centred miniaturized crossed obstruction (c) centred obstruction structure.
Figure 5B:
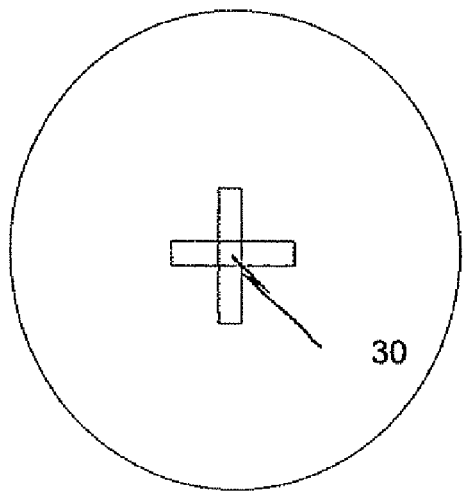
Figure 5C:
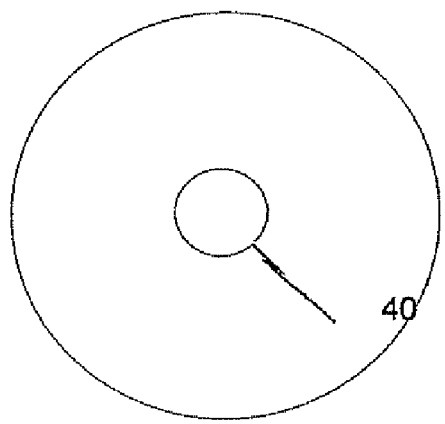
Figure 6:
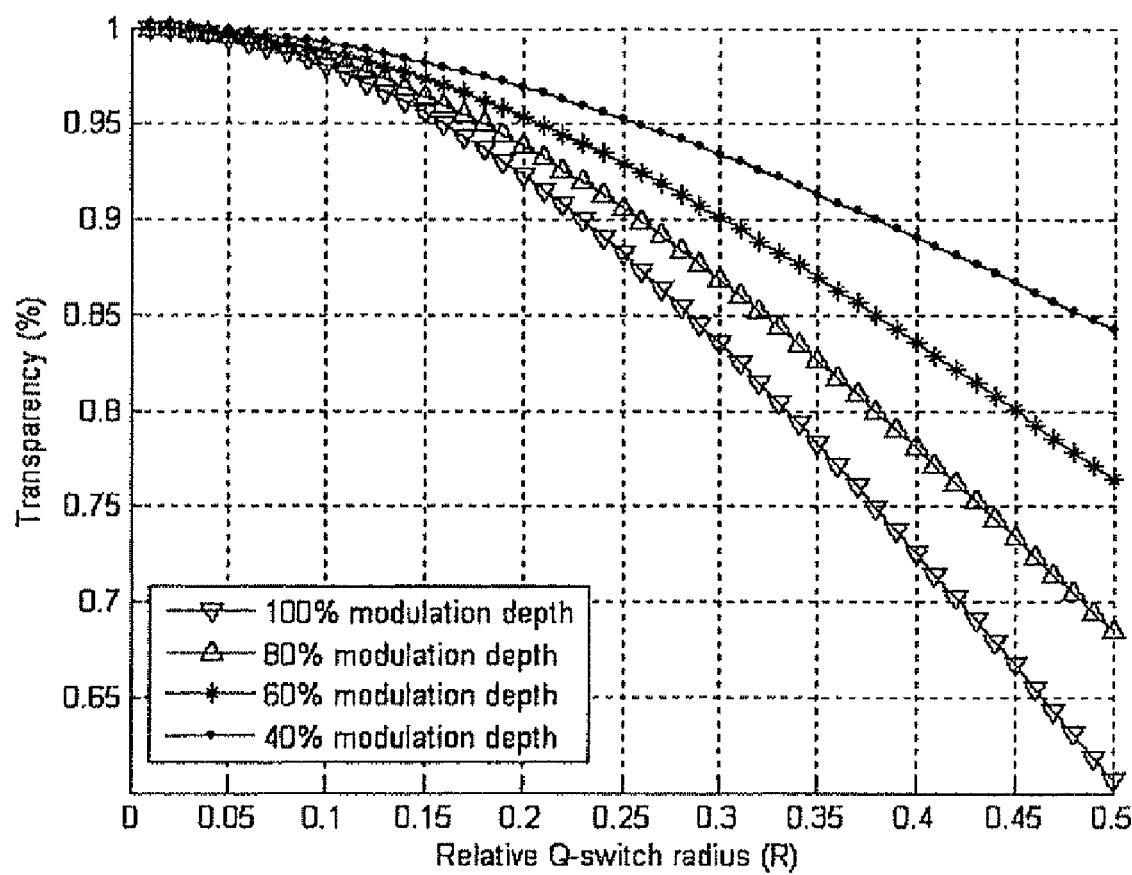
FIG. 6 shows the relationship between the modulated attenuation factor and the required area of the mode switch.

FIG. 5(a) shows a cavity 20 looking along its axis, and showing an obstruction for inducing localized loss in the form of a cross 15 centred at the beam centre 25. The ends 10 of the cross extend to the periphery of the cavity. Further downscaling of the wire as depicted by item 30 in FIG. 5(b) is possible as the length of the wire can be smaller than the diameter (as illustrated in FIG. 5(b)) of the laser beam because most of the power of the TEM00 mode is in the centre. Taking into account these observations allows one to minimize the overall dimensions of the (crossed) wire, such that the crossed wire can finally be reduced to an area 40 such depicted in FIG. 5(c), where the actual geometry of the modulating area is arbitrary. In the ideal situation the crossed wire introduces 100% losses within its obstruction area due to absorption, reflection, scattering, diffraction, . . . . When the introduced obstruction only partially affects the propagation of the zero order beam over its area, one may need to increase the area such that the total of the induced losses are sufficient to push the laser into higher order modes which will be extinguished by the aperture. FIG. 6 shows how the area needs to be adapted versus the amount of losses introduced by the obstruction. It can be seen from these graphs that for laser cavities whereby only a small obstruction losses are required (e.g. transparency=98%) for triggering the transverse mode hopping, that the required area is almost independent on the modulation depth of the obstruction. If larger obstruction losses factors are required (e.g. T=90%), then relative radius of the obstruction increases with the limitation of the modulation depth of the obstruction.

In some embodiments of this invention, one can replace the wire with a modulator which can control (modulate) the losses introduced. The location and area of the modulator can match that of the wire. Such a device can be an active modulator such as AO, EO, MO or a passive saturable absorber. Depending on the driving method of the modulator, a giant Q-switched laser pulse can be generated. In another embodiment of this invention, the modulator can be implemented by a saturable absorber with appropriate area, depending on the contrast between its low and high intensity transparency.

In another embodiment the modulator can be implemented by a mechanically moving object which temporarily induces a minimum amount of loss in the cavity. This can be a small rotating prism, polygon scanner, a resonant scanner, etc. i.e. miniaturized versions of prior art devices.

The implementation of the mentioned embodiment causes several important advantages: the area of the prior art active modulator devices such as AO, EO, MO, passive devices such as saturable absorber or mechanical devices can be made much smaller which has a significant cost reduction. One can calculate that the area reduction can be by a factor of 50 or so, in some cases even up to 1000. Due to the smaller dimensions, the processing yield of these obstructions can be higher, leading once more to a cost reduction. For those types of modulators based on a principle of operation having speed of operation dependent on area, a substantial speed increase due to the area reduction offered by embodiments of this invention can be envisaged. Another advantage of the area reduction is that temperature increases due to residual absorption in the transverse mode switching modulating device are substantially smaller and can be more effectively cooled as well. With proper precautions in the design and implementation of the embodiments of the invention, an economical Q-Switching laser with single-transverse (TEM00) mode can be produced. As the area of the device can be much smaller than the laser beam, it will be possible to Q-switch much larger laser beams than is now technically or economically feasible.

In principle, the modulator and the diaphragm can be implemented as transmissive or reflective devices as would be apparent to those skilled in the art.

Figure 7A:
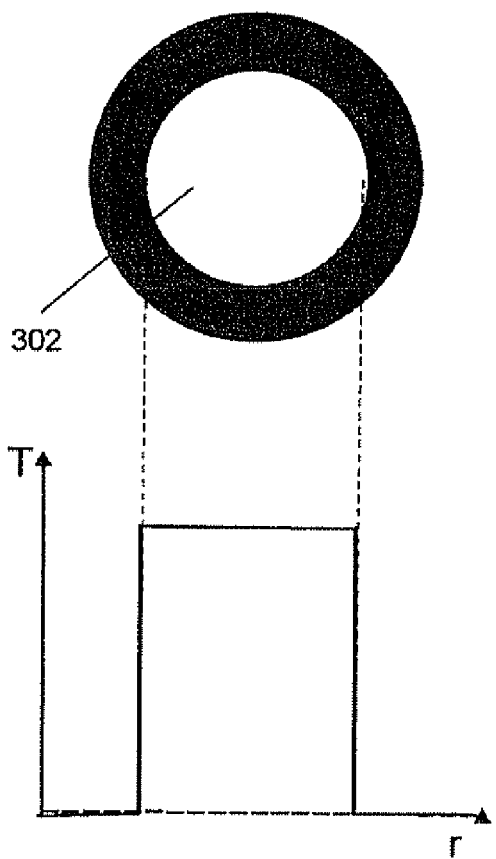
FIG. 7 shows various embodiments of aperture limited devices: (a) aperture limited diaphragm with its transmissivity, (b) aperture limited mirror with its reflectivity, (c) Gaussian beam mirror with its relative Gaussian reflectivity profile, as can be used in embodiments according to the present invention.
Figure 7B:
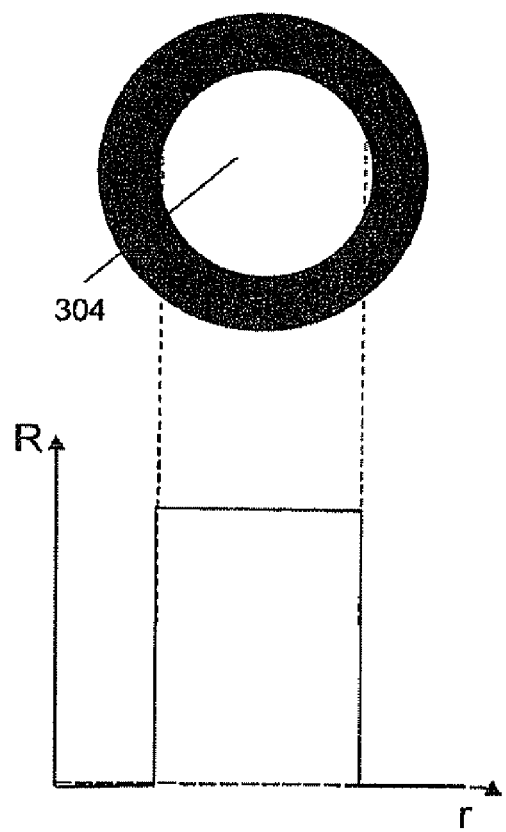
Figure 7C:
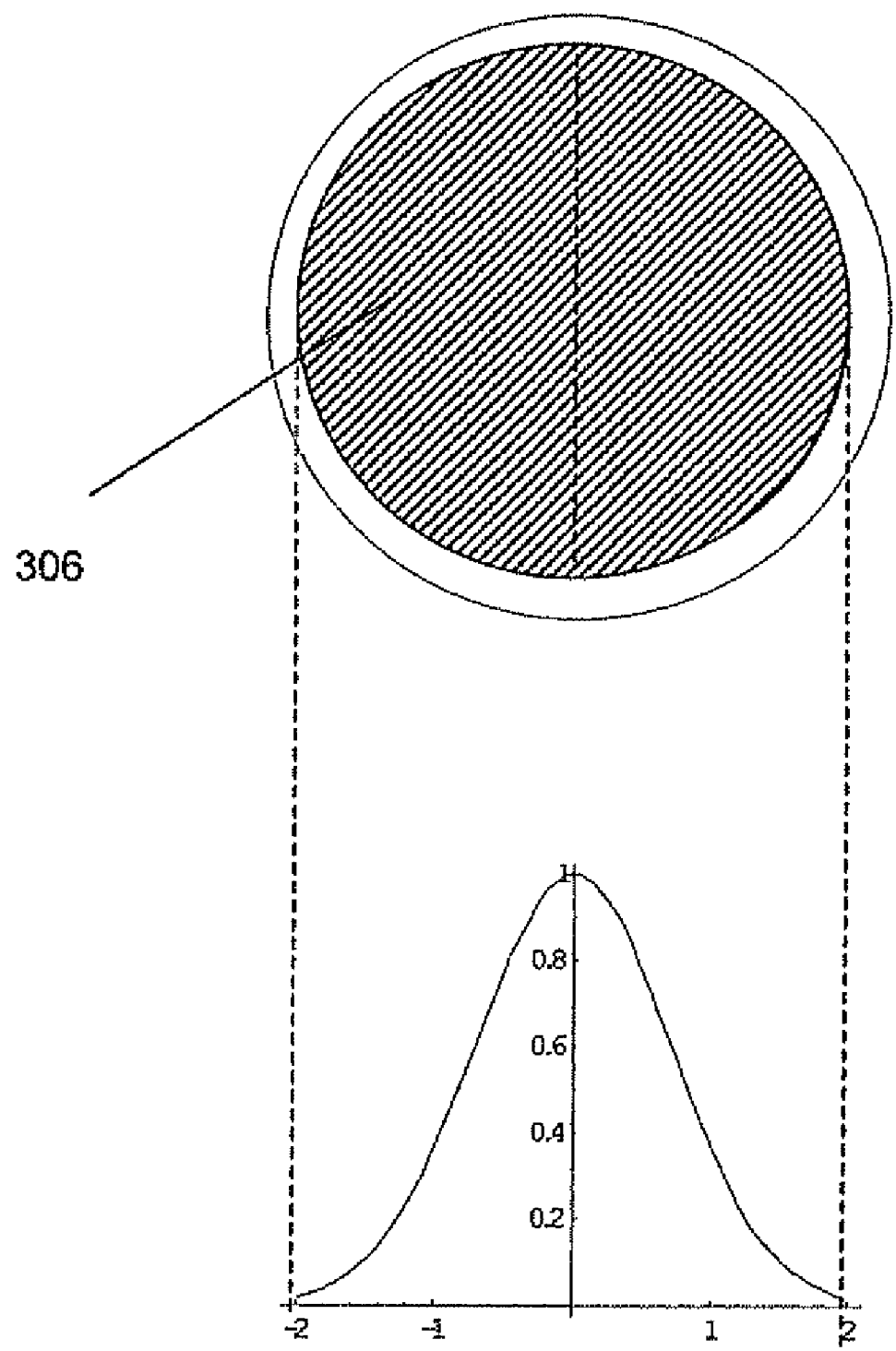
Figure 8A:
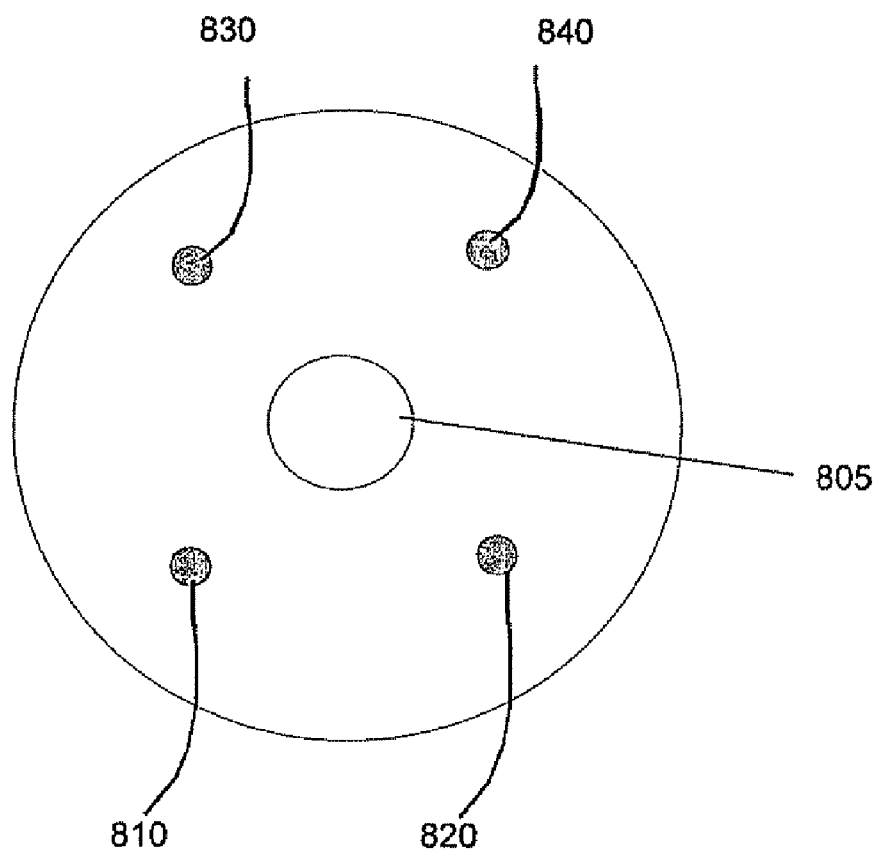
FIGS. 8 (a), (b) shows a centred obstruction structure (FIG. 8(a)) coinciding with the maximum intensity of a lower mode 440 (FIG. 8(b)) in combination with obstructions positioned close to the maxima of higher order modes visualised in graph 450 and an intensity distribution for two transverse lasing modes 440 and 450 (FIG. 8(b)), as can be used in embodiments according to the present invention.
Figure 8B:
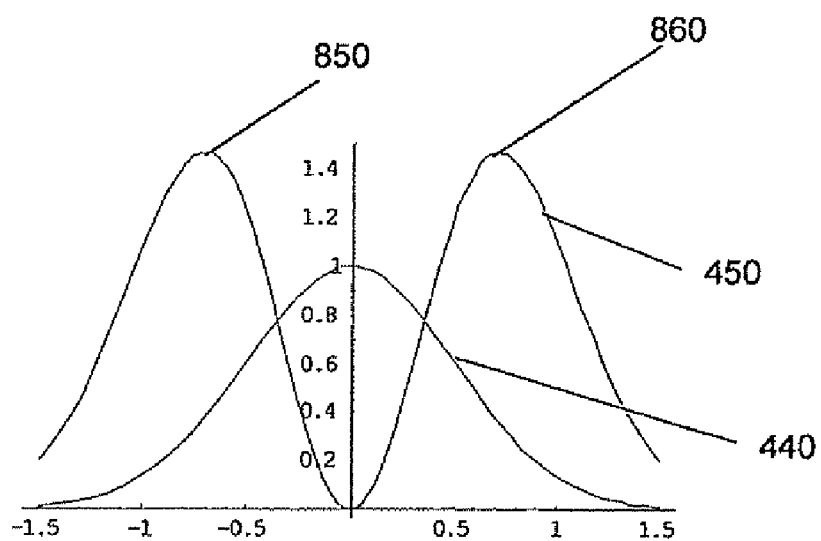

The diaphragm can be implemented to provide a controllable aperture as shown in FIG. 7a with 100% transmission within the aperture 302, or it can be a single aperture limited mirror 304 with near 100% reflection within the mirror aperture or double aperture limited mirror located at one or both ends of the cavity as shown in FIG. 7b. Another embodiment of the aperture is a Gaussian mirror 306 as depicted in FIG. 7c and having a Gaussian-like radial variation of the reflectivity as shown. This causes the losses of the higher-order modes to be larger than those of the fundamental modes. All these features typically influence only part of the beam, i.e. are only present in part of the cross-section of the beam. It is also possible to replace the aperture limiting device by a modulating device where some parts 810, 820, 830, 840 of the area are always in an absorbing or blocking state as shown in FIG. 8a. Only the absorption/blocking state of the central part 805 can be modulated. The constant absorbing or blocking parts are preferably localized at the maxima 850, 860 of the unwanted transverse mode patterns. Intensity distributions of both the wanted transverse mode pattern 440 and the unwanted transverse mode pattern 450 are indicated in FIG. 8(b).

In a second aspect of the present invention, the present invention relates to a system and method for generating transition from one lasing mode to another lasing mode as described above for the first aspect, but whereby the different lasing modes all are used as laser output. The system therefore is adapted such that no extinguisher 124 is present in the mode switch 120, resulting in a fixed mode switch. The mode switch 120 in the present embodiment thus basically comprises a loss modulators 122, as described in more detail above in the first aspect.

In a third aspect, the present invention also relates to a controller 150 adapted for controlling parameters of lasing system 100 or its mode switch 120 such that it provides a predetermined pulsed lasing action, as described above. The controller 150 thus may be adapted for controlling a mode switch 120 of the laser system such that a change is induced in a localised area of a beam of the laser, the localised area being substantially smaller than the dimensions of a beam, e.g. substantially smaller than the dimensions of a beam cross-section. The change may be induced directly. Substantially smaller than the dimensions of the beam of the laser, may be smaller than 99%, e.g. smaller than 90%, e.g. smaller than 50%, e.g. smaller than 10%, e.g. smaller than 5%, e.g. smaller than 1% or e.g. smaller than 0.1%. Typically the localised area wherein a change is induced, e.g. directly induced, is as small as possible to avoid heating problems and not to block too much power, but is sufficiently large to influence the given lasing mode substantially. The specific shape of the area of the beam, e.g. of the cross-section of the beam, that is influenced may be various and may be adapted to influence these regions of the beam comprising substantially regions where the lasing mode substantially contributes, e.g. regions with the largest intensity, although the invention is not limited thereto. A localised area of a beam of the laser may be an area in the cross-section of the laser beam, i.e. an area in the cross-section taken perpendicular to the light path. In other words, a modulator is used that only influences part of the beam or beam cross-section directly. The latter is performed to alter the given lasing mode, i.e. the lasing mode that typically propagates, e.g. when laser action is triggered. It may result in a temporarily change in lasing conditions, e.g. a temporarily loss in energy is induced, causing the oscillation to temporarily hop from a first lasing mode to a second lasing mode. Subsequently the controller 150 may be adapted to change the lasing conditions to the initial ones, leading to output of the laser pulse. The controller 150 may control different parameters of the mode switch 120 such as controlling the amount of loss generated, controlling the extinguishing factor. When the mode switch is an active device, typically the action of the active device may be controlled by the controller 150. E.g. if a rotating prism is used, e.g. the rotation speed may be controlled by the controller. Furthermore, the steering pulses applied to the lasing system may be controlled by the controller. Such a controller may be an electronic control system for use with an active-medium-based system or laser system in accordance with the present invention. The controller may include a computing device, e.g. microprocessor, for instance it may be a micro-controller. In particular, it may include a programmable controller, for instance a programmable digital logic device such as a Programmable Array Logic (PAL), a Programmable Logic Array, a Programmable Gate Array, especially a Field Programmable Gate Array (FPGA). The use of an FPGA allows subsequent programming of the laser system, e.g. by downloading the required settings of the FPGA. It may also comprise a memory for storing predetermined parameter values or parameter settings to be realised by the system and/or reading and/or writing capacities for reading/writing information about these parameter values or parameter settings.

It is to be understood that although preferred embodiments, specific constructions and configurations, as well as materials, have been discussed herein for devices according to the present invention, various changes or modifications in form and detail may be made without departing from the scope and spirit of this invention. It is therefore intended that the appended claims encompass any such modifications or embodiments. For example, whereas in the above embodiments the description is mainly related to devices, the invention also relates to the corresponding methods. Such a method for controlling a laser to produce laser pulses typically comprises providing lasing action according to a first lasing mode in a lasing material in a resonant optical cavity, temporarily inducing different lasing conditions in the cavity, causing the lasing action to hop to a different lasing mode and subsequently altering the different lasing conditions, allowing the output of a laser pulse according to the first lasing mode.

The invention claimed is:

1. A laser for outputting laser radiation, the laser comprising
    a lasing material in a resonant cavity adapted for supporting a transverse lasing mode of oscillation,
    wherein the laser furthermore comprises a mode switch adapted to induce a change in only a part of a beam of the laser substantially smaller than the dimension of the beam of the laser,
    wherein said mode switch comprises a loss modulator for inducing a loss in a localized area of a beam of the laser:
    wherein said mode switch is located at the center of said beam; and
    whereby the transverse lasing mode corresponding to the loss modulator being in a high loss state contains at least one lower order mode less than the transverse lasing mode corresponding to the loss modulator being in a low loss state.
    wherein said induced change is a temporarily induced change.

2. The laser according to claim 1, wherein said induced change causes the lasing mode of oscillation to hop to a different lasing mode of oscillation.

3. The laser according to claim 2, wherein the mode switch comprises an extinguisher arranged to extinguish the different lasing mode or modes.

4. The laser according to claim 3, the extinguisher comprising a diaphragm having one or more apertures arranged to extinguish the different lasing mode or modes.

5. The laser according to claim 3, the extinguisher being adapted to extinguish the different lasing mode or modes by any or a combination of inducing losses due to absorption, polarization changes, phase changes, scattering effects and diffraction effects.

6. The laser according to claim 1, wherein the mode switch is adapted to relax the induced change such that the oscillation returns to said a first lasing mode and outputs a laser pulse according to said first lasing mode.

7. The laser according to claim 1, the part of the beam of the laser that is a localized area is positioned where there are peaks in the energy of a given lasing mode.

8. The laser according to claim 1, a given lasing mode being the lowest transverse mode.

9. The laser according to claim 1, at least part of the mode switch being incorporated into a mirror of the cavity.

10. The laser according to claim 1, wherein the part of the beam of the laser is a part of the cross-section of the beam of the laser and wherein the dimension of the beam of the laser is a dimension of the cross-section of the beam of the laser.

11. A laser for outputting laser radiation, the laser comprising
    a lasing material in a resonant cavity adapted for supporting a transverse lasing mode of oscillation,
    wherein the laser furthermore comprises a mode switch adapted to induce a change in only a part of a beam of the laser substantially smaller than the dimension of the beam of the laser,
    wherein said mode switch comprises a loss modulator for inducing a loss in a localized area of a beam of the laser:
    wherein said mode switch is located at the center of said beam; and
    whereby the transverse lasing mode corresponding to the loss modulator being in a high loss state contains at least one lower order mode less than the transverse lasing mode corresponding to the loss modulator being in a low loss state, the mode switch comprising a moveable component substantially smaller than the dimension of the beam of the laser, the moveable component being moveable with respect to the beam of the laser, wherein the moveable component influences only said part of the beam of the laser and not the whole beam of the laser.

12. A laser for outputting laser radiation, the laser comprising a lasing material in a resonant cavity adapted for supporting a transverse lasing mode of oscillation, wherein the laser furthermore comprises a mode switch adapted to induce a change in only a part of a beam of the laser substantially smaller than the dimension of the beam of the laser, wherein said mode switch comprises a loss modulator for inducing a loss in a localized area of a beam of the laser:

wherein said mode switch is located at the center of said beam; and whereby the transverse lasing mode corresponding to the loss modulator being in a high loss state contains at least one lower order mode less than the transverse lasing mode corresponding to the loss modulator being in a low loss state, the laser furthermore comprising a controller for controlling the mode switch adapted to bring the laser in a first state having a first lasing mode not sustained in the resonant optical cavity and for inducing a temporary change for temporary altering the given first lasing mode to a second lasing mode sustained in the resonant optical cavity, thus outputting the laser pulse.

13. A machining device comprising the laser as described in claim 1.

14. A method of controlling a laser, the laser comprising a lasing material in a resonant optical cavity capable of supporting a given transverse mode of oscillation when lasing action is started, the method comprising:

bringing the laser in a state having a given first lasing mode of oscillation;

inducing a change in only a part of a beam substantially smaller than the dimension of the beam of the laser;

wherein inducing a change comprises altering a loss, said loss being localized at the center of the beam and causing the first lasing mode to hop to a different lasing mode, whereby the transverse lasing mode corresponding to the loss modulator being in a high loss state contains at least one lower order mode less than the transverse lasing mode corresponding to the loss modulator being in a low loss state;

wherein said first lasing mode is not sustained in the resonant optical cavity and wherein the method is adapted to produce a laser pulse, said inducing a change is inducing temporary a change for temporary altering the given first lasing mode to a second lasing mode sustained in the resonant optical cavity, thus outputting the laser pulse.

15. The method according to claim 14, wherein bringing the laser in a state having a first lasing mode being not sustained comprises extinguishing said mode.

16. A method of controlling a laser, the laser comprising a lasing material in a resonant optical cavity capable of supporting a given transverse mode of oscillation when lasing action is started, the method comprising:

bringing the laser in a state having a given first lasing mode of oscillation;

inducing a change in only a part of a beam substantially smaller than the dimension of the beam of the laser;

wherein inducing a change comprises altering a loss, said loss being localized at the center of the beam and causing the first lasing mode to hop to a different lasing mode, whereby the transverse lasing mode corresponding to the loss modulator being in a high loss state contains at least one lower order mode less than the transverse lasing mode corresponding to the loss modulator being in a low loss state;

wherein bringing the laser in a state comprises supporting a beam of the laser having a given first lasing mode of oscillation, and wherein inducing a change comprises inducing a temporary change by inducing a loss, said method further comprising, after said temporary inducing a change, subsequently reducing the induced loss temporarily thus temporarily returning the lasing mode to the first lasing mode and outputting the laser pulse.

17. The method according to claim 16, the method comprising using a modulator for inducing said loss causing the given lasing mode to hop to a second, different lasing mode and extinguishing the second, different lasing mode.

18. The method according to claim 14, having a step of narrowing one or more apertures of a diaphragm to extinguish the different lasing mode.

19. The method according to claim 14, the part of the beam being a localized area being positioned where there are peaks in the energy of the given transverse mode.

20. The method of claim 16, the first lasing mode being a lowest transverse mode.

21. The method according to claim 14, the second lasing mode being a lowest transverse mode.

22. A controller for controlling a laser to produce laser radiation according to the method as described in claim 14.

23. A method of controlling a laser, the laser comprising a lasing material in a resonant optical cavity capable of supporting a given transverse mode of oscillation when lasing action is started, the method comprising:

bringing the laser in a state having a given first lasing mode of oscillation;

inducing a change with a mode switch in only a part of a beam substantially smaller than the dimension of the beam of the laser;

wherein inducing a change comprises altering a loss, said loss being localized at the center of the beam and causing the first lasing mode to hop to a different lasing mode, whereby the transverse lasing mode corresponding to the loss modulator being in a high loss state contains at least one lower order mode less than the transverse lasing mode corresponding to the loss modulator being in a low loss state;

wherein the mode switch includes a moveable component substantially smaller than the dimension of the beam of the laser, the moveable component being moveable with respect to the beam of the laser, wherein the moveable component influences only said part of the beam of the laser and not the whole beam of the laser.

* * * * *